Sept. 22, 1959 N. NICOLAUS 2,905,138
INDICATING INSTRUMENT HAVING NON-PARALLAX DIAL
Filed Dec. 3, 1957 2 Sheets-Sheet 1

INVENTOR.
Norbert Nicolaus.
BY
Olson, Mecklenburger, van Holst,
Pendleton & Neuman. Attys.

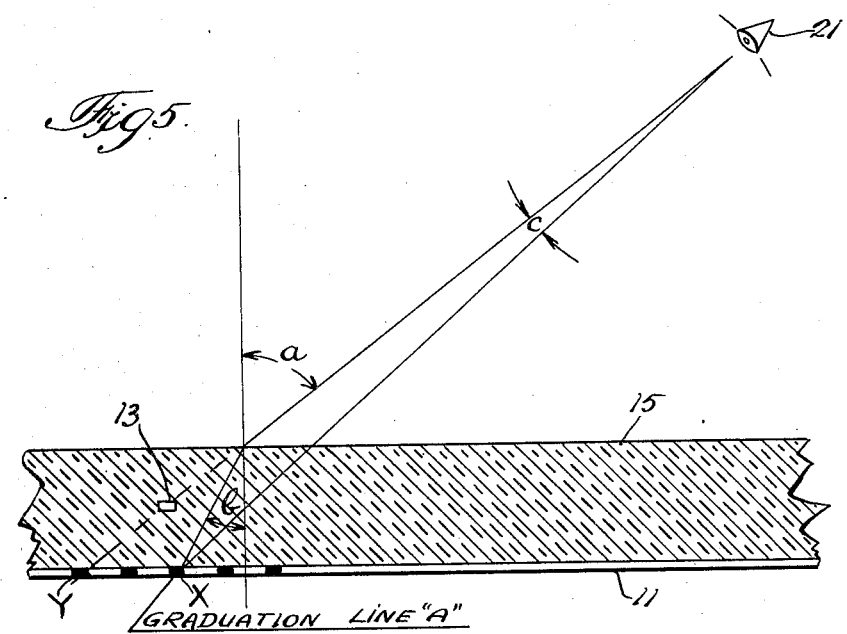
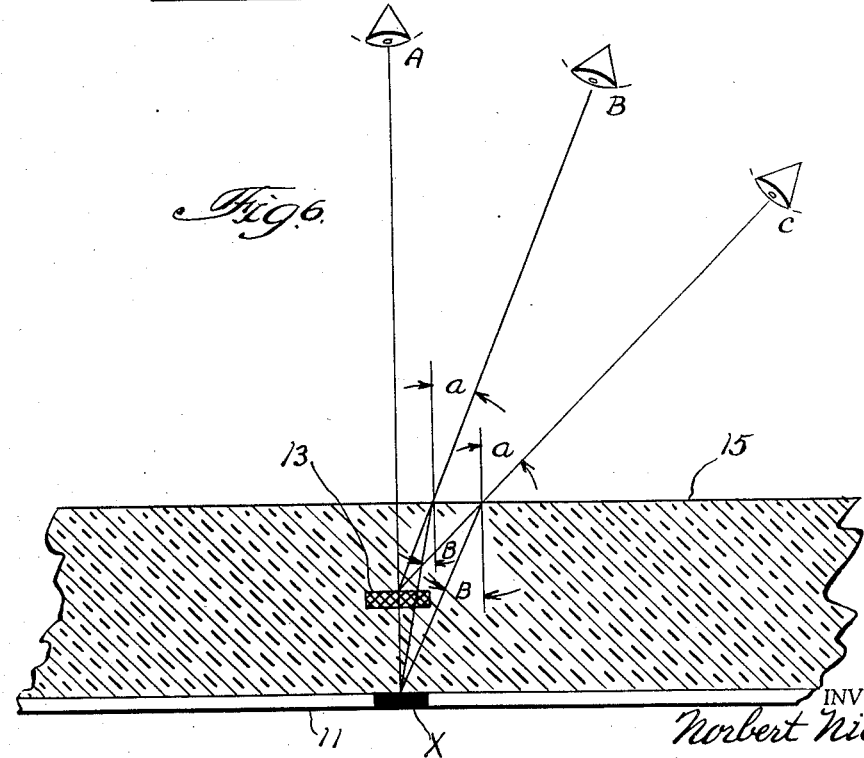

United States Patent Office 2,905,138
Patented Sept. 22, 1959

2,905,138

INDICATING INSTRUMENT HAVING NON-PARALLAX DIAL

Norbert Nicolaus, Mount Prospect, Ill., assignor to Jas. P. Marsh Corporation, Skokie, Ill., a corporation of Illinois Application December 3, 1957, Serial No. 700,349

4 Claims. (Cl. 116—129)

The present invention relates to indicating instruments and has special reference to such instruments having non-parallax dials which may be accurately read when viewed at angles to a line normal to the face of the instrument dial.

With the usual indicating instrument, there is a dial having indications or graduations thereon and a pointer movable with respect thereto and spaced a distance from the face of the dial. Unless the eyes of the observer are substantially in front of the instrument or at least in the plane of both the point of the indicator and the indicia therebeneath which is normal to the dial face, parallax will result and the instrument will appear to give an incorrect reading. This may create serious problems when it is not possible for the observer to scan the instruments from directly in front thereof, such as when it is necessary to watch the instruments on a large instrument panel where the instruments are spread over a wide area and some of them are a distance above the eyes of the observer.

The present invention corrects this parallax effect of the usual instrument and makes it possible to read them accurately even when viewed at a substantial angle to a line normal to the face of the instrument dials.

Instruments having dials embodying the present invention may be quite accurately read at angles up to about 60 or 65°, thus making it possible to read all the instruments on a large instrument panel from one location or with relatively little movement on the part of the observer. This is even true with instruments in which there may be some movement of the indicator with respect to its distance from the dial beneath, such as in the case of a helical coil dial thermometer.

An object of the present invention is to provide a substantially non-parallax instrument dial.

Another object is to provide a substantially non-parallax instrument dial of simple, permanent, inexpensive construction.

A further object is to provide a dial of the above type which will remain quite accurate within practical limits despite some variation in the distance of the indicator from the dial face therebeneath.

Further objections and advantages will be apparent from the following description and claims when considered with the accompanying drawings in which:

Fig. 5 is an enlarged diagrammatic showing of a part of an instrument dial embodying the present invention illustrating the manner in which the parallax effect is overcome; and Fig. 6 is a further enlarged diagrammatic showing illustrating the manner in which the dial may be accurately read with the eye of the observer at different angles with respect to the general plane of the instrument dial.

Figure 1:
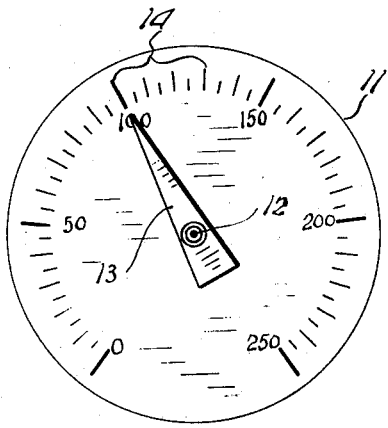
Figure 1 is a front elevational view of an instrument dial and pointer viewed from a point directly in front thereof with the pointer at the 100 mark on the dial.
Figure 2:
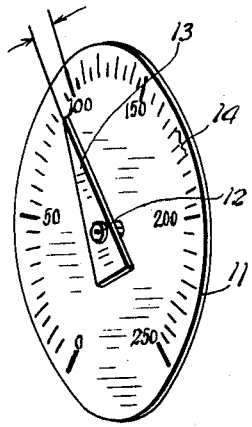
Fig. 2 is an isometric view of the instrument dial and indicator shown in Fig. 1 rotated about a vertical axis and illustrating the usual parallax effect.
Figure 3:
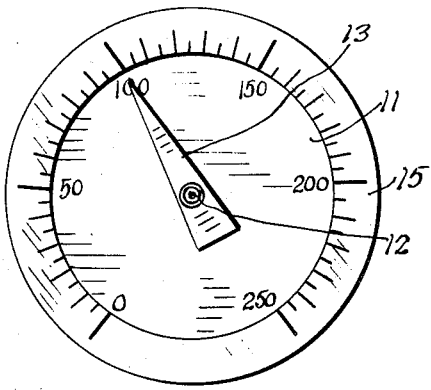
Fig. 3 is a front plan view of an instrument dial embodying the present invention and pointer viewed directly from in front thereof with the pointer at the 100 mark on the dial.
Figure 4:
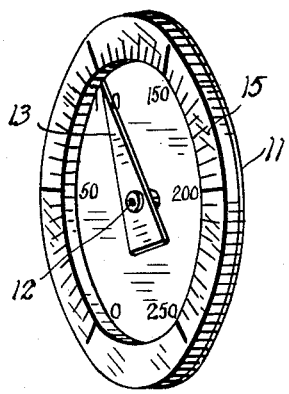
Fig. 4 is an isometric view of the dial and indicator shown in Fig. 3 rotated about a vertical axis the same amount as the dial in Fig. 2 and illustrating the non-parallax effect.

Referring to the drawings, and more particularly to Figs. 1 and 2, there is shown an instrument having a dial embodying the present invention. This may consist of a dial face 11 having indicia thereon indicating pressure, temperature, etc. with various graduations between the primary marks to permit it to be readily read. Extending centrally through the dial face 11 there is an indicator shaft 12 having an indicator or pointer 13 mounted thereon. The indicator 13 is of such length that the pointer end thereof is adjacent the indicia 14, the inner ends of which may be substantially evenly spaced from the center of the dial face 11. Accordingly, as the indicator 13 rotates, it will pass closely adjacent the inner ends of the indicia.

A conventional gauge of this character may be accurately read when the observer is directly in front of the dial as shown in Fig. 1. However, when an effort is made to view the dial from a position at a substantial angle, as illustrated in Fig. 2, there is a parallax effect which results in the instrument giving an accurate reading.

By placing a strip of transparent material 15 over the indicia markings on the dial face so that the edge thereof is adjacent the pointer end of the indicator 13, this parallax effect is overcome and the instrument dial may be accurately read at a substantial angle to the face of the dial. The angle within which the dial may be thus accurately read may be on the order of 60° or even more, depending upon the size of the dial and the parts and their relative position.

The transparent material of the dial may be glass, a resin such as Lucite or Plexiglas, or other suitable transparent material. In a dial thermometer having an outer diameter of about 3", an annular glass strip having a thickness of .15" and a coefficient of refraction of 1.5 may be employed and the tip of the pointer be positioned approximately .06" above the face of the dial.

The proper values and dimensions for the present instrument may be determined from the equation $$K\frac{(t-h)}{t}\sqrt{1-\frac{\sin^2 a}{K}}-\cos a=0$$

where $$K=\frac{\sin a}{\sin b}=\text{coefficient of refraction}$$

$t=$thickness of the transparent material in inches
$h=$the distance in inches of the pointer end above the dial face
$a=$angle of incidence
$b=$angle of refraction By solving the above equation for the values given above, it will be found that to prevent any parallax the angle $a$ should be about 40°. As the angle $a$ is increased or decreased there will be a very slight parallax effect. However, for all practical purposes the instrument described above is accurate up to angles of 60 to 65° under certain conditions.

As is illustrated in Fig. 5, when the end of the indicator 13 is positioned above graduation line X and the eye of the observer is as indicated at 21, it will appear to the observer that the indicator is directly over the line X due to the coefficient of refraction of the transparent material 15. Without the transparent material 15 it would appear to the observer that the indicator was over graduation line Y. Due to the coefficient of refraction line A appears to be raised up the amount of the angle C (Fig. 5) and accordingly to be directly under the indicator 13, thus giving an accurate reading.

The present invention has been illustrated in connection with a dial having a circular face and a pointer rotating on an axis about the center thereof. The invention can also be applied with other types of dials such, for example, as where the indicia is in a straight line and the indicator moves lineally adjacent to the indicia. To incorporate the present invention with a dial of this type, a straight strip of transparent material would be placed over the indicia with one edge thereof closely adjacent the tip of the pointer.

As the distance of the tip of the pointer from the face of the dial may be varied somewhat without affecting the accuracy of the dial reading, the present invention is particularly suitable for use in instruments such as dial thermometers actuated by a helical coil bi-metallic element. In such instruments the indicator shaft may be moved axially, moving the indicator toward and away from the dial face therebeneath. With the present invention this effect is not generally apparent. Likewise, variations in the angle $\alpha$ are not generally apparent so that from a practical standpoint the gauges may be accurately read without parallax effect.

While particular embodiments of this invention have been illustrated and described, it will be understood, of course, that the invention is not to be limited thereto since many modifications may be made, and it is contemplated therefor by the appended claims to cover any modifications that come within the true scope of this invention.

I claim:

1. A non-parallax indicating instrument comprising a dial having indicia on the face thereof, an indicator having a pointing end movable closely adjacent the ends of at least certain of said indicia in a definite path, and a strip of transparent material of substantially uniform thickness overlying said indicia and having one edge adjacent the path of the pointer end of said indicator, the pointing end of said indicator being spaced from said dial face a distance less than the thickness of said strip.

2. A non-parallax indicating instrument comprising a dial having indicia on the face thereof, an indicator having a pointing end movable closely adjacent the ends of at least certain of said indicia in a definite path, said indicia being uniformly spaced from the path of said pointer end, and a flat strip of transparent material overlying said indicia and having one edge adjacent the path of the pointing end of said indicator, the pointing end of said indicator being spaced from said dial face a distance more than one-fourth the thickness of said strip and less than three-fourths of said thickness.

3. In a non-parallax indicating instrument a dial, an indicator having a pointing end movable over said dial in a definite path, indicating indicia on said dial outwardly of said path with at least certain of said indicia extending inwardly substantially to said path, and a strip of transparent material mounted on said dial over said indicia with the inner edge of said transparent strip closely adjacent the path of said indicator end, the pointing end of said indicator being spaced from said dial a distance less than the thickness of said strip.

4. In a non-parallax indicating instrument a dial, an indicator having a pointing end movable over said dial in a definite path, indicating indicia on said dial outwardly of said path with at least certain of said indicia extendng inwardly substantially to said path, and a substantially flat strip of transparent material mounted on said dial over said indicia with the inner edge of said transparent strip closely adjacent the path of said indicator end, the pointing end of said indicator being spaced from said dial a distance less than the thickness of said strip.

References Cited in the file of this patent

UNITED STATES PATENTS

| 2,627,245 | Kimball | Feb. 3, 1953 |

FOREIGN PATENTS

| 626,161 | Great Britain | July 11, 1949 |